(12) United States Patent
Tanaka et al.

(10) Patent No.: US 8,945,733 B2
(45) Date of Patent: Feb. 3, 2015

(54) MAGNETIC RECORDING MEDIUM

(75) Inventors: Yoshikazu Tanaka, Chiba (JP); Norio Chiba, Chiba (JP); Manabu Oumi, Chiba (JP); Masakazu Hirata, Chiba (JP); Yoko Shinohara, Chiba (JP); Sachiko Tanabe, Chiba (JP)

(73) Assignee: Seiko Instruments Inc. (JP)

(*) Notice: Subject to any disclaimer, the term of this patent is extended or adjusted under 35 U.S.C. 154(b) by 281 days.

(21) Appl. No.: 13/421,929

(22) Filed: Mar. 16, 2012

(65) Prior Publication Data

US 2012/0237797 A1  Sep. 20, 2012

(30) Foreign Application Priority Data

Mar. 18, 2011 (JP) ................ 2011-060988
Jan. 12, 2012 (JP) ................ 2012-004074

(51) Int. Cl.
*G11B 5/66* (2006.01)
*G11B 5/65* (2006.01)
*G11B 5/74* (2006.01)
*G11B 5/855* (2006.01)
*G11B 5/00* (2006.01)

(52) U.S. Cl.
CPC ...... *G11B 5/65* (2013.01); *G11B 5/746* (2013.01); *G11B 5/855* (2013.01); *G11B 2005/0021* (2013.01)
USPC .......................................... 428/836; 360/59

(58) Field of Classification Search
CPC ........ G11B 5/743; G11B 5/746; G11B 5/855; G11B 5/82; G11B 5/8404; G11B 2220/252
USPC ............................................. 360/59; 428/836
See application file for complete search history.

(56) References Cited

U.S. PATENT DOCUMENTS

| 8,264,788 B2* | 9/2012 | Gao et al. ................... 360/59 |
| 8,488,277 B2* | 7/2013 | Kanegae ...................... 360/135 |
| 8,507,114 B2* | 8/2013 | Peng et al. ................... 428/827 |
| 2005/0193405 A1* | 9/2005 | Hattori et al. .............. 720/659 |
| 2006/0154110 A1* | 7/2006 | Hohlfeld et al. ........... 428/823 |
| 2006/0210838 A1* | 9/2006 | Kamimura et al. ........ 428/832 |
| 2008/0026255 A1* | 1/2008 | Das et al. .................. 428/831.2 |
| 2011/0043941 A1* | 2/2011 | Champion et al. ......... 360/59 |

FOREIGN PATENT DOCUMENTS

| JP | 2006260620 | 9/2006 |
| JP | 2010165404 | 7/2010 |

OTHER PUBLICATIONS

Neil Robertson, "Magnetic Data Storage with Patterned Media," HGST San Jose Research Center, Jan. 2010.*

* cited by examiner

*Primary Examiner* — Holly Rickman
(74) *Attorney, Agent, or Firm* — Adams & Wilks (57) ABSTRACT

A magnetic recording medium in which information can be recorded using a heat-assisted magnetic recording method comprises a recording layer formed on a substrate. The recording layer has a plurality of magnetic recording bit regions and a plurality of high thermal conductors each extending inside a corresponding one of the bit regions. The high thermal conductors have a thermal conductivity higher than that of the recording layer and assist in dissipating heat energy imparted to the bit regions during the recording of information.

11 Claims, 9 Drawing Sheets

MAGNETIC RECORDING MEDIUM

BACKGROUND OF THE INVENTION

1. Field of the Invention

The present invention relates to a magnetic recording medium that is suitable for recording information using a heat-assisted magnetic recording method.

2. Background Art

Recently, a magnetic recording medium (hereinafter, referred to as a disk) such as a hard disk in a computer device requires a new high density in response to a need to perform the recording and playback of high capacity and high-density information or the like. For that reason, in order to suppress influence between adjacent magnetic domains or thermal fluctuations to the minimum, a medium having strong coercive force has begun to be adopted as the disk. For that reason, it is difficult to record information on the disk.

Thus, in order to solve the disadvantage mentioned above, a writing method using a heat-assisted magnetic recording method (a hybrid magnetic recording method) is provided in which the magnetic domain is locally heated using a spot light with a focused light or a near-field light to temporarily lower the coercive force, thereby performing the writing onto the disk in the meanwhile.

Particularly, in the case of using the near-field light, it is possible to handle optical information in a region equal to or less than a wavelength of light to which an optical system of the related art is limited, and it is possible to promote increased density of recording bits unobtainable in the past.

Incidentally, many disks corresponding to the heat-assisted magnetic recording method mentioned above are now provided, but in such disks, there is a need for effective heating of a magnetic body (a magnetic cluster constituted by one or plurality of magnetic particles) constituting a recording layer as one of the requirements for reliably performing the heat-assisted magnetic recording.

This is because rapidly heating a desired magnetic body to lower the coercive force leads to a suppression of recording defects and reliability of writing.

Thus, a magnetic recording medium is known in which a highly thermal conductive thin film having a thermal conductivity higher than that of the recording layer is disposed on an upper portion and a side portion of a recording track (the magnetic body) constituting the recording layer (for example, see JP-A-2010-165404). According to the magnetic recording medium, it is possible to transmit heat from the outside of the recording track by the highly thermal conductive thin film, which is able to rapidly heat the entire recording track.

However, in the magnetic recording medium disclosed in JP-A-2010-165404, since the highly thermal conductive thin film is disposed in a state of coming into contact with the upper portion and the side portion of the recording track, a part of the heat transmitted to the highly thermal conductive thin film during heating easily escapes in a direction different from that of the recording track. For that reason, it is difficult to transmit the heat from the highly thermal conductive thin film side to the recording track side without waste, whereby the recording track is not effectively heated.

Furthermore, there is also a concern that heat not contributing to the heating of the recording track and escaping in the direction different from the recording track being transmitted to other recording tracks via the adjacent highly thermal conductive thin film may happen. For that reason, there is also a possibility of heat lowering the thermal stability of the other recording tracks, information recorded on the recording track in advance being lost and information being erroneously recorded.

SUMMARY OF THE INVENTION

The present invention has been made in view of such circumstances, and an object thereof is to provide a magnetic recording medium which is able to effectively heat a desired magnetic body to perform writing with high reliability, and is able to ensure the thermal stability of the other magnetic body during recording to suppress recording loss, erroneous recording or the like.

The present invention adopts means as below in order to solve the problems as mentioned above.

(1) According to an aspect of the invention, there is provided a magnetic recording medium with a recording layer formed on a substrate, wherein a high thermal conductor having a thermal conductivity higher than that of the recording layer is disposed inside a plurality of recording bit regions constituting the recording layer, respectively.

In the invention, since heat is transmitted from the high thermal conductor disposed inside the recording bit region constituted by one or more magnetic particles toward the surrounding recording bit region, the recording bit region recording information can be effectively heated. That is, upon heating the high thermal conductor, the recording bit region surrounding the high thermal conductor is heated from the inside, heat does not escape to other recording bit regions not to be recorded, and the heat is transmitted to the recording bit region to be recorded without waste. Thus, the heating efficiency of the recording bit region is improved.

Furthermore, since heat hardly escapes to other recording bit regions not to be recorded, it is possible to suppress other recording bit regions not to be recorded being heated to lower the thermal stability. Thus, it is possible to prevent information recorded on other recording bit regions in advance from being lost, or erroneous information is recorded.

In addition, compared to a case where the high thermal conductor is disposed so as to surround the outside of the recording bit region, an area occupied by the high thermal conductor can be reduced while maintaining the heating efficiency to the recording bit region to be recorded. As a result, it is possible to further improve the recording density of the magnetic recording medium.

(2) In the magnetic recording medium according to the aspect of the invention, it is preferable that the high thermal conductor be disposed so as to penetrate the recording layer.

In this case, when the high thermal conductor comes into contact with a lower layer of the recording layer and the substrate, whereby when heat is discharged from the recording bit region, the heat is easily discharged from the heated recording bit region via the high thermal conductor from the recording layer to the outside of the magnetic recording medium, and thus, cooling efficiency is further improved.

(3) In the magnetic recording medium according to the aspect of the invention, it is preferable that a ground layer is formed between the substrate and the recording layer, and the high thermal conductor is disposed so as to penetrate the recording layer and the ground layer.

In this case, by sufficiently ensuring a contact area between the high thermal conductor and the ground layer, when discharging heat from the recording bit region, since the heat is easily discharged from the heated recording bit region via the high thermal conductor from the ground layer to the outside of the magnetic recording medium, the cooling efficiency can be increased.

(4) In the magnetic recording medium according to the aspect of the invention, it is preferable that the high thermal conductor penetrate through the recording layer, and a cross-sectional area of a direction perpendicular to the stacking direction to the high thermal conductor is increased, as the area faces the substrate in the stacking direction.

In this case, since a contact area with the layer provided on a lower surface of the recording layer is increased, when discharging heat from the recording bit region, the heat is easily discharged from the heated recording bit region via the high thermal conductor from the layer to the outside of the magnetic recording medium, and thus, the cooling efficiency is further improved.

(5) In the magnetic recording medium according to the aspect of the invention, it is preferable that a recording layer constituting the same recording bit region as the recording layer surrounding the high thermal conductor be disposed inside the high thermal conductor.

In this case, since a contact area between the high thermal conductor and the recording layer is increased, and the recording layers disposed in both of the outside and the inside the high thermal conductor are heated, the heating efficiency of the recording bit region is further improved.

(6) In the magnetic recording medium according to the aspect of the invention, it is preferable that an outer peripheral surface of the high thermal conductor be formed with a plurality of concave portions depressed inward along the outer peripheral surface.

In this case, since the contact area between the high thermal conductor and the recording layer is increased, the heating efficiency of the recording bit region is further improved.

(7) In the magnetic recording medium according to the aspect of the invention, it is preferable that the recording layer is formed with a separating portion separating the recording layer into a plurality of partitions, and the separating portion be filled with a low thermal conductor having a thermal conductivity lower than that of the recording layer.

In this case, by separating the recording layer into the plurality of partitions by the low thermal conductor, it is possible to suppress that heat is transmitted from a partition contributing to the heating to other partition not contributing to the heating, and by confining the heat in the partition contributing the heating, the heating efficiency of the recording bit region to be recorded is further improved.

(8) In the magnetic recording medium according to the aspect of the invention, it is preferable that the recording bit region and the high thermal conductor be concentrically placed.

In this case, since heat is uniformly transmitted from the high thermal conductor toward the recording bit region, the recording bit region can be more effectively heated.

(9) In the magnetic recording medium according to the aspect of the invention, it is preferable that the high thermal conductor be formed of a metallic material or a dielectric material.

In this case, the high thermal conductor can be easily worked by an existing working method, for example, such as etching, without requiring a special working. In addition, a material forming the high thermal conductor may be a single material and a combined material.

(10) In the magnetic recording medium according to the aspect of the invention, it is preferable that an orientation layer for orienting the magnetization direction of magnetic particles constituting the recording bit region in a certain direction to a substrate surface of the substrate be formed between the substrate and the recording layer, and the high thermal conductor be disposed so as to further penetrate through the orientation layer.

In this case, since the orientation layer is formed between the substrate and the recording layer, in addition to the ground layer, the more stable recording can be performed. Particularly, an easy axis of magnetization of the magnetic particles of the recording layer is oriented with respect to the substrate surface in a certain direction, for example, the horizontal direction or the vertical direction by the orientation layer. Thus, the stable horizontal or vertical magnetic recording medium is provided.

Furthermore, since the high thermal conductor also penetrates through the orientation layer, a contact area to the high thermal conductor can be sufficiently ensured. Thus, when discharging the heat from the recording bit region, the heat is easily discharged from the heated recording bit region via the high thermal conductor to the outside of the magnetic recording medium, and thus, the cooling efficiency can be increased.

(11) In the magnetic recording medium according to the aspect of the invention, it is preferable that the orientation layer be formed further to the recording layer side than the ground layer.

In this case, since the orientation layer is formed at the recording layer side, the easy axis of magnetization in the recording layer can be more accurately oriented, and the more stable recording is easily performed.

According to the magnetic recording medium according to the aspects of the invention, since the recording bit region surrounds the high thermal conductor, the heat is transmitted from the high thermal conductor to the surrounding recording bit region without waste, and the recording bit region can be effectively heated. Furthermore, it is possible to prevent that information recorded on other recording bit regions in advance is lost or erroneous information is recorded, and an occupation area of the high thermal conductor can be reduced while maintaining the heating efficiency to the recording bit region to be recorded. As a result, the recording density of the magnetic recording medium can be further improved.

DETAILED DESCRIPTION OF THE INVENTION

First Embodiment

Hereinafter, a first embodiment of a magnetic recording medium in the present embodiment will be described based on the drawings. In addition, in the respective drawings used in the description as below, the scale is appropriately changed in order to make each member a recognizable size.

Figure 1:
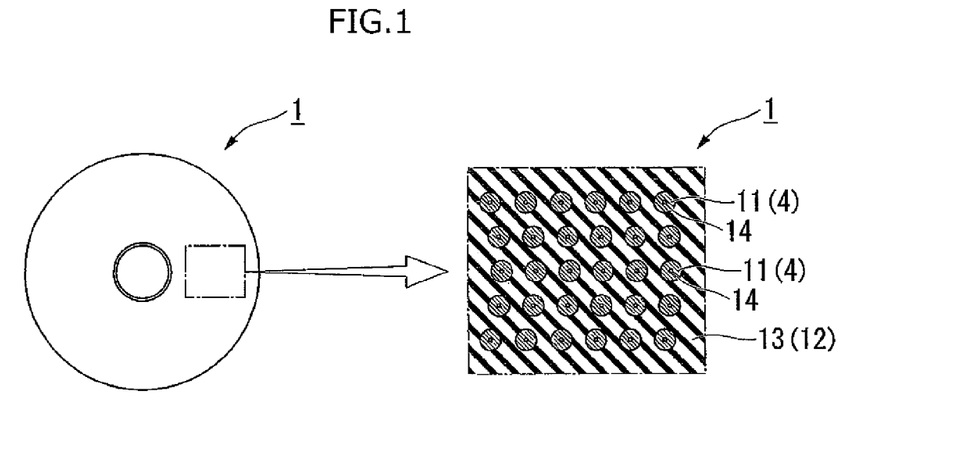
FIG. 1 is a top view and a partially enlarged view that show a magnetic recording medium in a first embodiment of the present invention.
Figure 2:
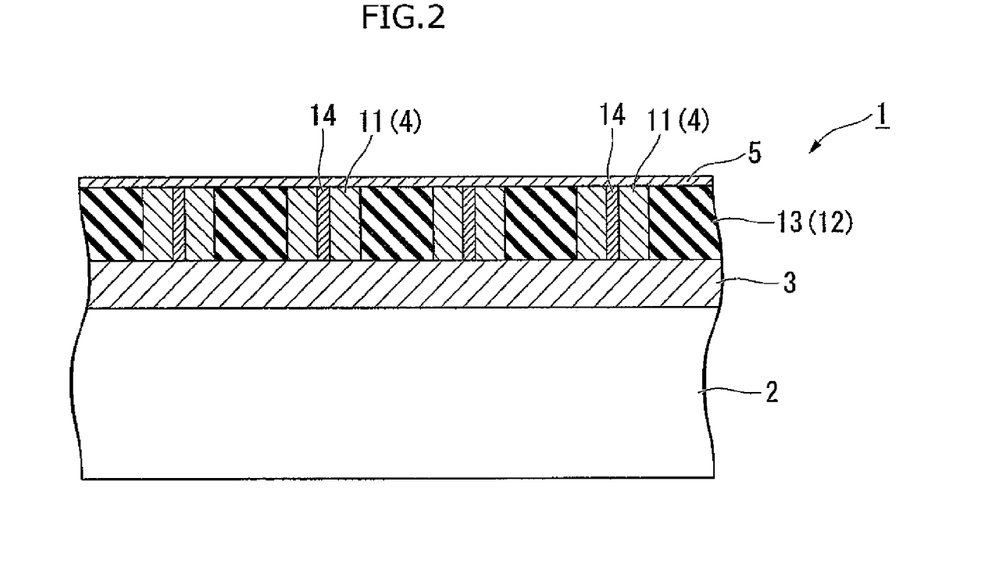
FIG. 2 is an enlarged cross-sectional view that shows the magnetic recording medium of FIG. 1.
Figure 3:
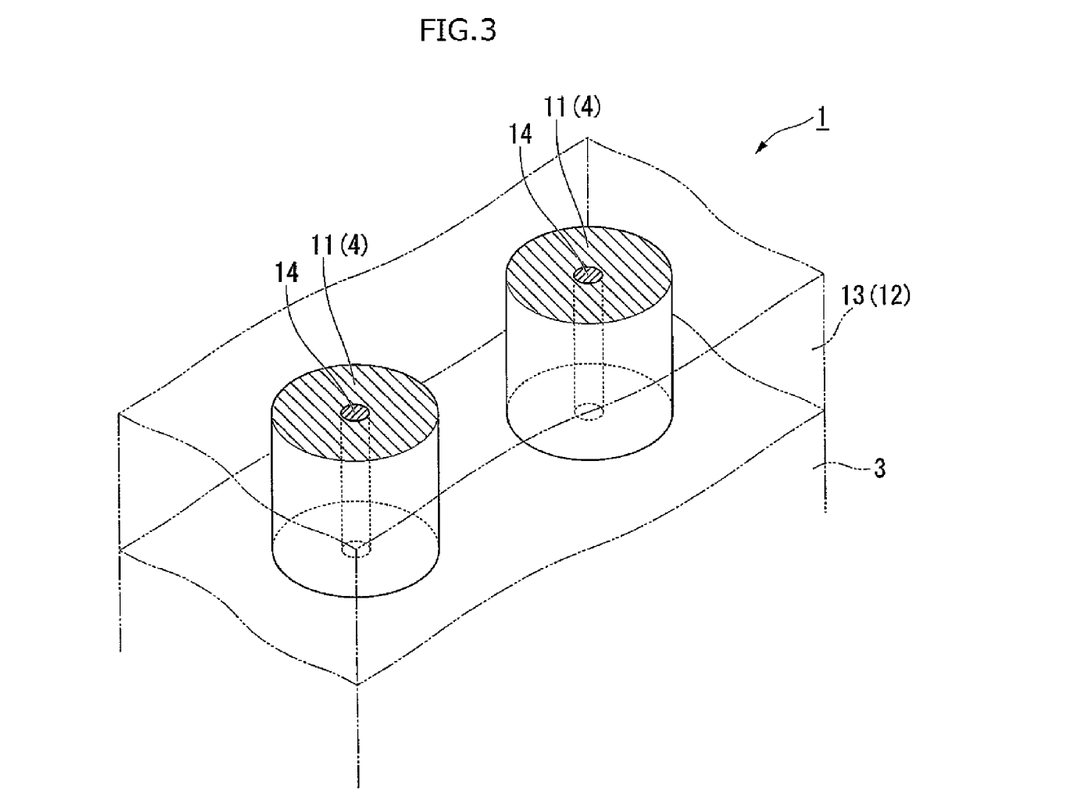
FIG. 3 is a partially perspective view that shows the magnetic recording medium of FIG. 1.

As shown in FIG. 1, a magnetic recording medium 1 in the present embodiment forms a disk shape when viewed from an upper surface, and as shown in FIGS. 2 and 3, includes a substrate 2, a ground layer 3 formed on the substrate 2, a recording layer 4 formed on the ground layer 3, and a protective layer 5 formed on the recording layer 4. In addition, in a partially enlarged view of FIG. 1 and FIG. 3, the protective layer 5 is removed. Furthermore, in the present embodiment, a direction perpendicular to a center axis of the magnetic recording medium 1 forming the disk shape when viewed from the upper surface is the radial direction, and a direction around the center axis is the circumferential direction.

The substrate 2 is formed of, for example, glass, aluminum or aluminum alloy, and AlTiC, and ensures the rigidity of the magnetic recording medium 1.

The ground layer 3 is formed of, for example, a steel alloy such as NiFe, FeTaC, and CoTaZr, and a soft magnetic body such as a nickel alloy or a cobalt alloy, and generates a magnetic field with a vertical direction component to the recording layer 4 by refluxing a magnetic flux from a magnetic head (not shown) passing through the recording layer 4 to the magnetic head.

For example, the recording layer 4 is formed of, for example, a magnetic alloy, a granular film of the magnetic alloy and an oxide film or the like, or a material with an additional element added thereto, such as CoCrPt, and CoCrPt—SiO$_2$, and the magnetization direction is suitably reversed by the magnetic flux to be applied from the magnetic head.

Furthermore, the recording layer 4 is constituted by a plurality of recording bit regions 11, and the plurality of recording bit regions 11 are divided by a separating portion 12 penetrating through the recording layer 4. The recording bit region 11 is constituted by one magnetic particle or more, and forms a cylindrical shape as shown in FIGS. 1 and 3. Moreover, as shown in FIG. 1, the recording bit region 11 constitutes recording tracks by being arranged at equal distances in the circumferential direction, and the recording tracks are concentrically arranged at intervals in the radial direction. In addition, the recording bit region 11 may form other shapes without being limited to the cylindrical shape.

As shown in FIGS. 1 to 3, a low thermal conductor 13 having a thermal conductivity lower than that of the recording layer 4 is disposed on the separating portion 12.

The low thermal conductor 13 is formed of, for example, silicon oxide, silicon nitride, aluminum oxide or the like, and makes it difficult to transmit the heat between adjacent recording bit regions 11. In addition, air may be adopted as the low thermal conductor 13.

In the middle of the recording layer 4 constituting each recording bit region 11, a cylindrical high thermal conductor 14 penetrates into the recording layer 4, reaching the ground layer 3, and is disposed concentrically with the recording bit region 11. That is, each high thermal conductor 14 extends in the thickness direction of the recording layer 4 inside (into the interior of) a corresponding recording bit region 11. The high thermal conductor 14 has a thermal conductivity higher than that of the recording layer 4, is formed of, for example, a metallic material or a dielectric material such as copper, silver, gold, aluminum, diamond, diamond-like carbon, and carbon nano tube, and heat is easily transmitted between the high thermal conductor and the recording layer 4 contacting thereto. As illustrated in FIGS. 1-3, each high thermal conductor 14, in plan view, is completely surrounded by a corresponding recording bit region.

The protective layer 5 is formed of, for example, diamond-like carbon, silicon oxide, silicon nitride, copper oxide, aluminum oxide or the like, and physically and chemically protects the recording layer 4 from the outside of the magnetic recording medium 1.

Next, a manufacturing method of the magnetic recording medium 1 of the configuration as mentioned above will be described.

Figure 4A:
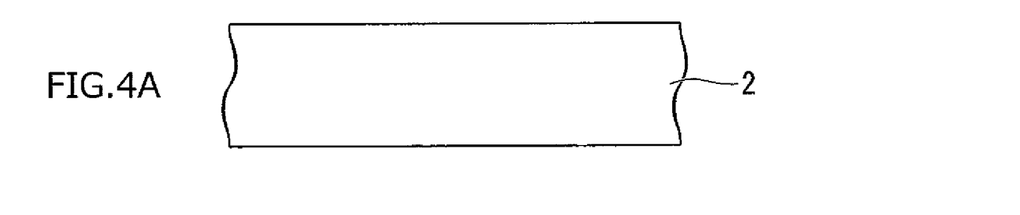
FIGS. 4A to 4D are enlarged cross-sectional views that show a manufacturing method of the magnetic recording medium of FIG. 1.
Figure 4B:
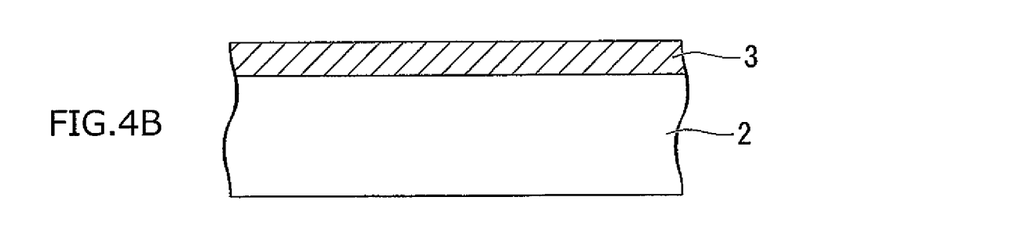
Figure 4C:
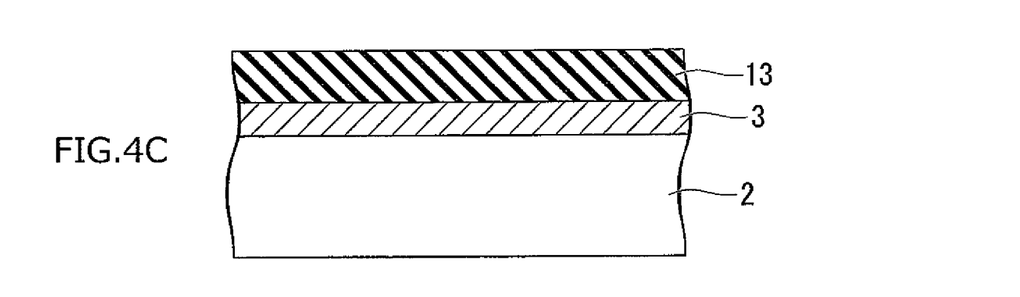
Figure 4D:
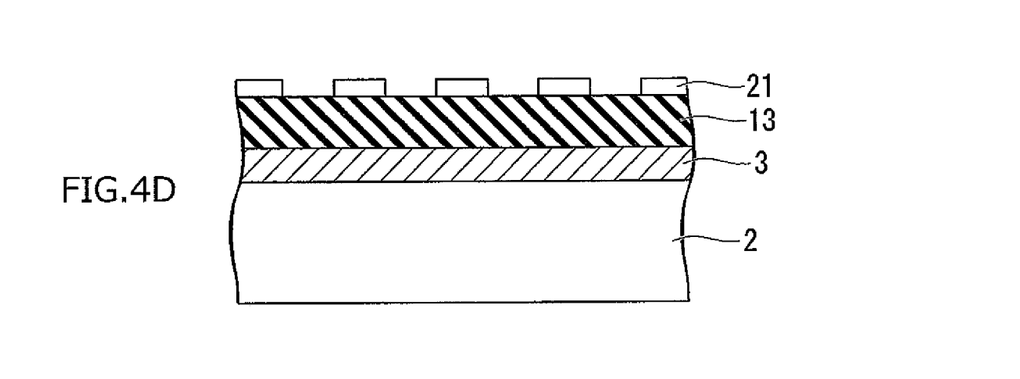

Firstly, for example, the ground layer 3 is formed on the substrate 2 by a sputtering method, a CVD method or the like (FIGS. 4A and 4B). Moreover, similarly, for example, the low thermal conductor 13 is formed on the ground layer 3 by the sputtering method, the CVD method or the like (FIG. 4C). After that, a first resist layer 21 for patterning is applied onto the low thermal conductor 13, and a portion corresponding to a forming position of the recording bit region 11 of the first resist layer 21 is removed by photolithography and development to form an opening pattern (FIG. 4O).

Figure 5A:
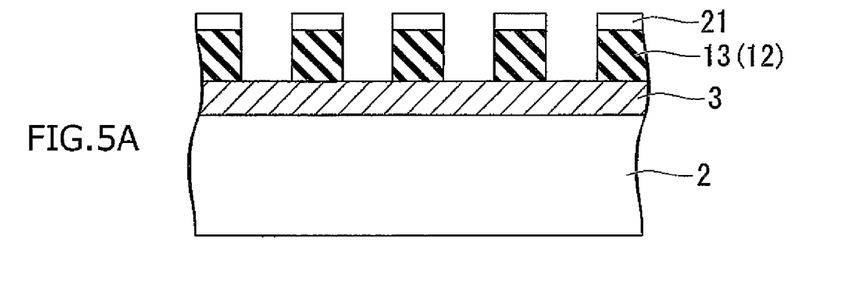
FIGS. 5A to 5D are enlarged cross-sectional views that show the manufacturing method of the magnetic recording medium of FIG. 1.
Figure 5B:
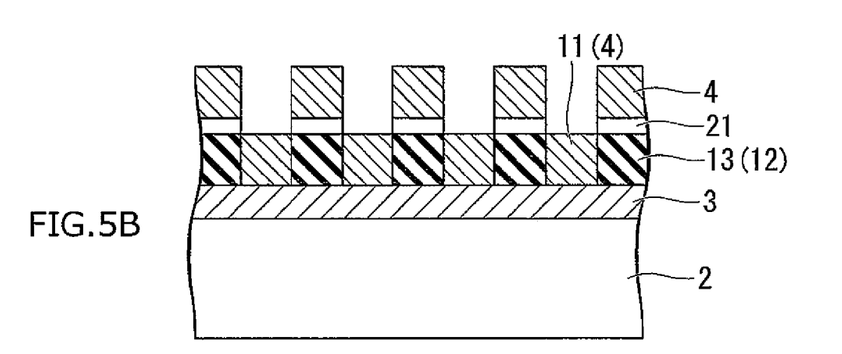
Figure 5C:
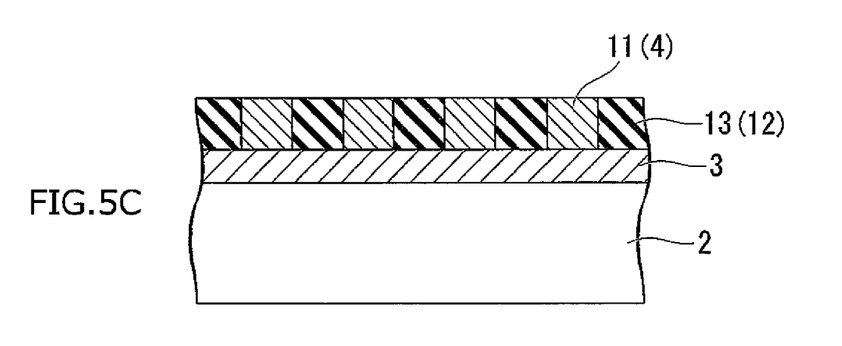
Figure 5D:
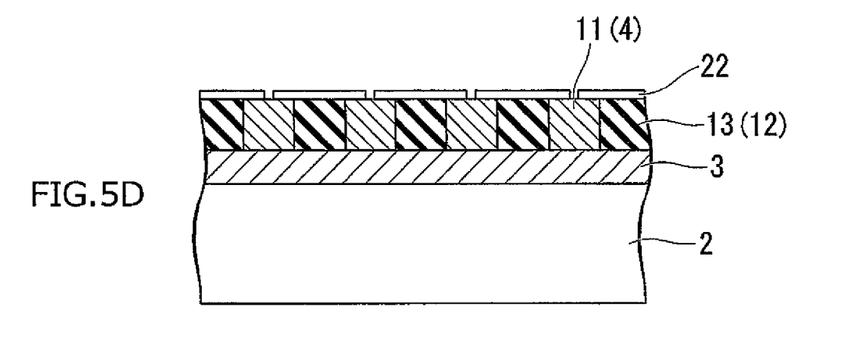

Next, for example, the low thermal conductor 13 exposed from the opening pattern of the first resist layer 21 is removed by, for example, an etching process (FIG. 5A). Moreover, for example, the recording layer 4 is formed on the first resist layer 21 not removed and the exposed ground layer 3 by the sputtering method, the CVD method or the like (FIG. 5B, the first resist layer 21 is removed by a solvent such as acetone, and a surface is flattened by a CMP method or the like (FIG. 5C)). As a result, the recording bit region 11 divided by the separating portion 12 constituted by the remaining lower thermal conductor 13 is formed. After that, a second resist layer 22 for patterning is applied onto the low thermal conductor 13 and the recording layer 4, and a portion corresponding to a forming position of the high thermal conductor 14 of the second resist layer 22 is removed by the photolithography and the development to form an opening pattern (FIG. 5D).

Figure 6A:
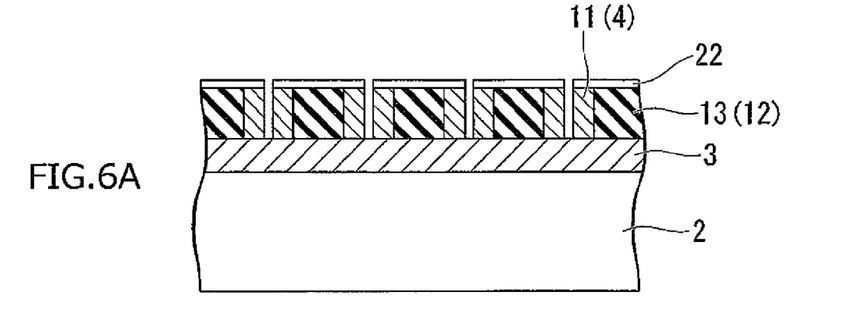
FIGS. 6A to 6D are enlarged cross-sectional views that show the manufacturing method of the magnetic recording medium of FIG. 1.
Figure 6B:
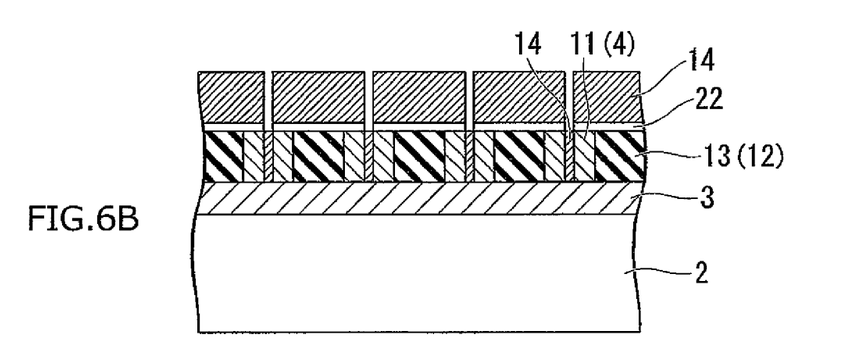
Figure 6C:
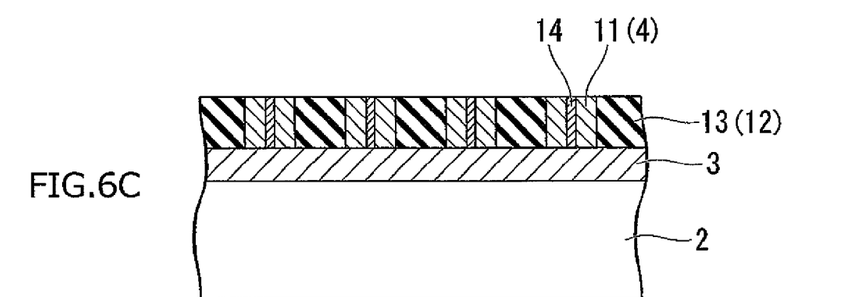
Figure 6D:
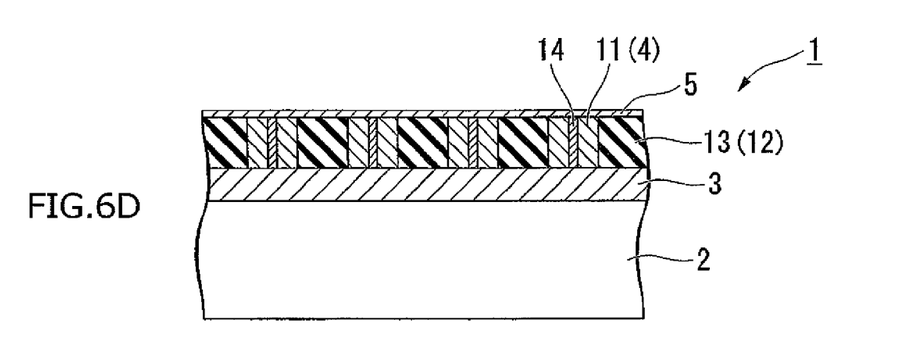

Next, the recording layer 4 exposed from the opening pattern of the second resist layer 22 is removed by, for example, the etching process (FIG. 6A). Moreover, for example, the high thermal conductor 14 is formed on the second resist layer 22 and the exposed ground layer 3 by the sputtering method, the CVD method or the like (FIG. 6B), the second resist layer 22 is removed by a solvent such as acetone, and a surface is flattened by the CMP method or the like (FIG. 6C). After that, for example, the protective layer 5 is formed by the sputtering method, the CVD method or the like (FIG. 6D).

In this manner, the magnetic recording medium 1 is manufactured.

Next, a recording method of information in the magnetic recording medium 1 of the configuration as mentioned above will be described.

Firstly, the high thermal conductor 14 disposed in the middle of the recording bit region 11 recording information of the recording layer 4 is irradiated with a spot light or a near-field light to heat the high thermal conductor 14. The heated high thermal conductor 14 transmits the heat toward the recording bit region 11 surrounding the high thermal conductor 14. As a result, the recording bit region 11 to be recorded is locally heated and a coercive force is temporarily lowered. Moreover, while the coercive force is lowered, a magnetic field is applied to the recording bit region 11 to record information.

At this time, since the recording bit region 11 to be recorded surrounds the periphery of the high thermal conductor 14 to be heated, the high thermal conductor 14 does not cause the heat to escape to other recording bit regions 11 not to be recorded, but heats the recording bit region 11 to be recorded. Furthermore, the other recording bit regions 11 are separated from the heated high thermal conductor 14, and the lower thermal conductor 13 surrounds the outside of the recording bit region 11, and thus heating of the other recording bit regions 11 not to be recorded is suppressed.

After that, after recording information on the recording bit region 11 in the meantime, the heat accumulated in the recording bit region 11 is naturally discharged or is transmitted to the ground layer 3 via the high thermal conductor 14 in which the heating is stopped, and is discharged to the outside of the magnetic recording medium 1 via the ground layer 3 and the substrate 2. At this time, since the high thermal conductor 14 comes into contact with the ground layer 3 through the recording layer 4, the heat of the heated recording bit region 11 is easily transmitted to the ground layer 3 through the high thermal conductor 14.

In this manner, information is recorded on the magnetic recording medium 1.

According to the magnetic recording medium 1 of the configuration as mentioned above, since the recording bit region 11 to be recorded surrounds the high thermal conductor 14 to be heated, the heat is transmitted from the high thermal conductor 14 to the recording bit region 11 without waste, which can effectively heat the recording bit region 11. At this time, since the recording bit region 11 and the high thermal conductor are concentrically placed and the heat is uniformly transmitted from the high thermal conductor 14 toward the recording bit region 11, the recording bit region 11 can be more effectively heated.

Furthermore, the heat hardly escapes to the other recording bit region 11 not to be recorded, and the recording bit region 11 is divided by the low thermal conductor 13, and thus the recording bit region 11 not to be recorded being heated is suppressed. For that reason, it is possible to prevent that information recorded on the other recording bit region 11 in advance is lost and erroneous information is recorded, and an area occupied by the high thermal conductor can be reduced while maintaining the heating efficiency to the recording bit region 11 to be recorded. As a result, the recording density of the magnetic recording medium 1 can be further improved.

In addition, since the heat of the recording bit region 11 heated via the high thermal conductor 14 penetrating through the recording layer 4 is easily transmitted to the ground layer 3, it is easy to discharge the heat of the recording bit region 11 to the outside of the magnetic recording medium 1.

Second Embodiment

Next, a second embodiment of the magnetic recording medium in the present invention will be described based on the drawings. In addition, a basic configuration of the embodiment described herein is the same as that of the first embodiment mentioned above, and other elements are added to the first embodiment mentioned above. Thus, in FIG. 7, the same components as those of FIGS. 1 to 6D are denoted by the same reference numerals, and the descriptions thereof will be omitted.

Figure 7:
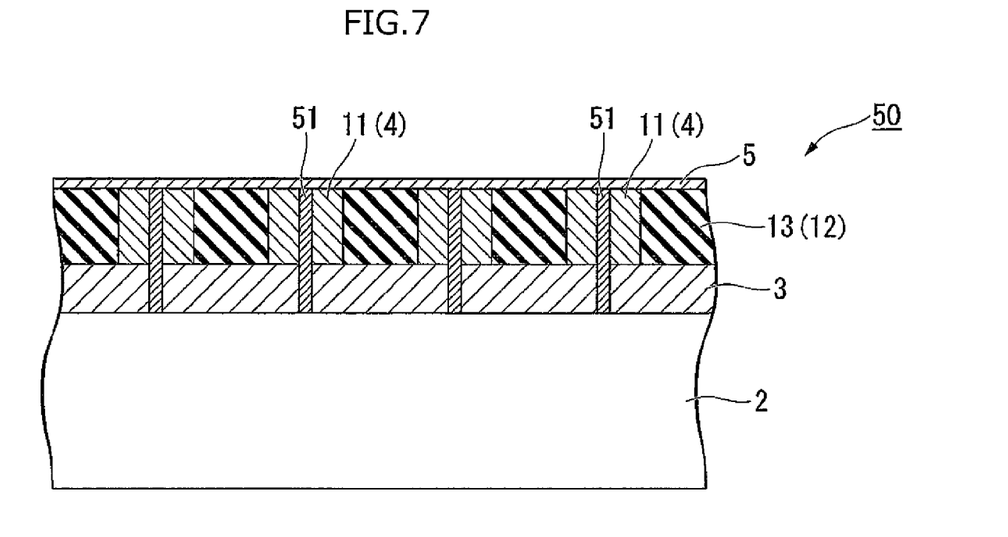
FIG. 7 is an enlarged cross-sectional view that shows a magnetic recording medium in a second embodiment of the invention.

As shown in FIG. 7, in a magnetic recording medium 50 of the present embodiment, a high thermal conductor 51 comes into contact with the substrate 2 through the recording layer 4 and the ground layer 3.

According to the magnetic recording medium 50 of the configuration as mentioned above, since a contact area between the high thermal conductor 51 and the ground layer 3 can be sufficiently ensured, the heat is easily transmitted from the recording layer 4 heated via the high thermal conductor 51 to the ground layer 3, whereby heat discharging efficiency of the heated recording bit region 11 can be improved.

Third Embodiment

Next, a third embodiment in the present invention will be described based on the drawings. In addition, a basic configuration of the embodiment described herein is the same as that of the second embodiment mentioned above, and other elements are added to the second embodiment mentioned above. Thus, in FIG. 8, the same components as those of FIG. 7 are denoted by the same reference numerals, and the descriptions thereof will be omitted.

Figure 8:
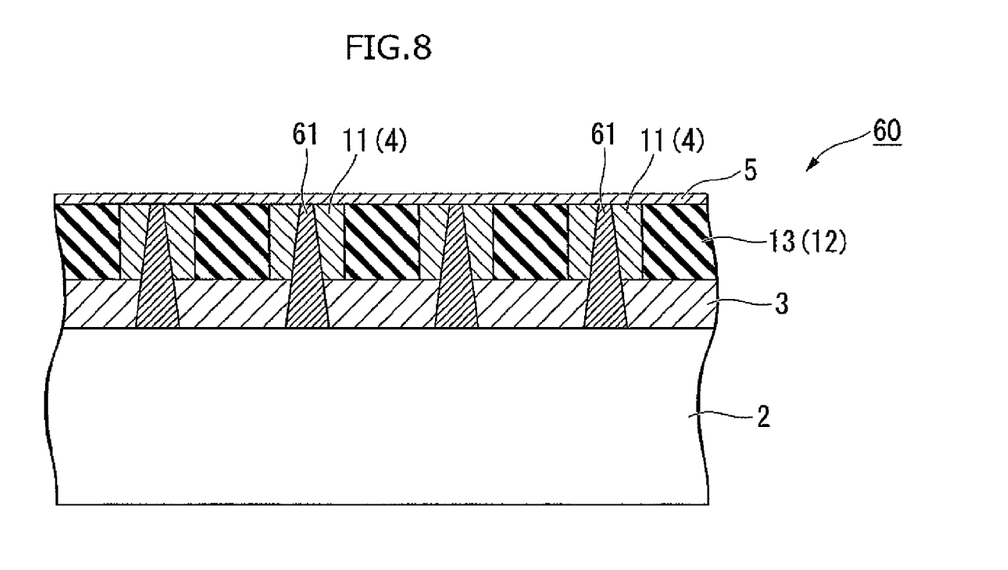
FIG. 8 is an enlarged cross-sectional view that shows a magnetic recording medium in a third embodiment of the invention.

As shown in FIG. 8, in a magnetic recording medium 60 of the present embodiment, a high thermal conductor 61 forms a circular truncated cone shape. That is, a cross-sectional area of a direction perpendicular to a stacking direction of the magnetic recording medium 60 in the high thermal conductor 61 is increased as facing the substrate 2 in the stacking direction.

According to the magnetic recording medium 60 of the configuration as mentioned above, since a contact area between the high thermal conductor 61 and the ground layer 3 is increased, the heat discharging efficiency of the heated recording bit region 11 can be further improved.

Fourth Embodiment

Next, a fourth embodiment of the magnetic recording medium in the present invention will be described based on the drawings. In addition, a basic configuration of the embodiment described herein is the same as that of the first embodiment mentioned above, and other elements are added to the first embodiment mentioned above. Thus, in FIG. 9, the same components as those of FIGS. 1 to 6D are denoted by the same reference numerals, and the descriptions thereof will be omitted.

Figure 9:
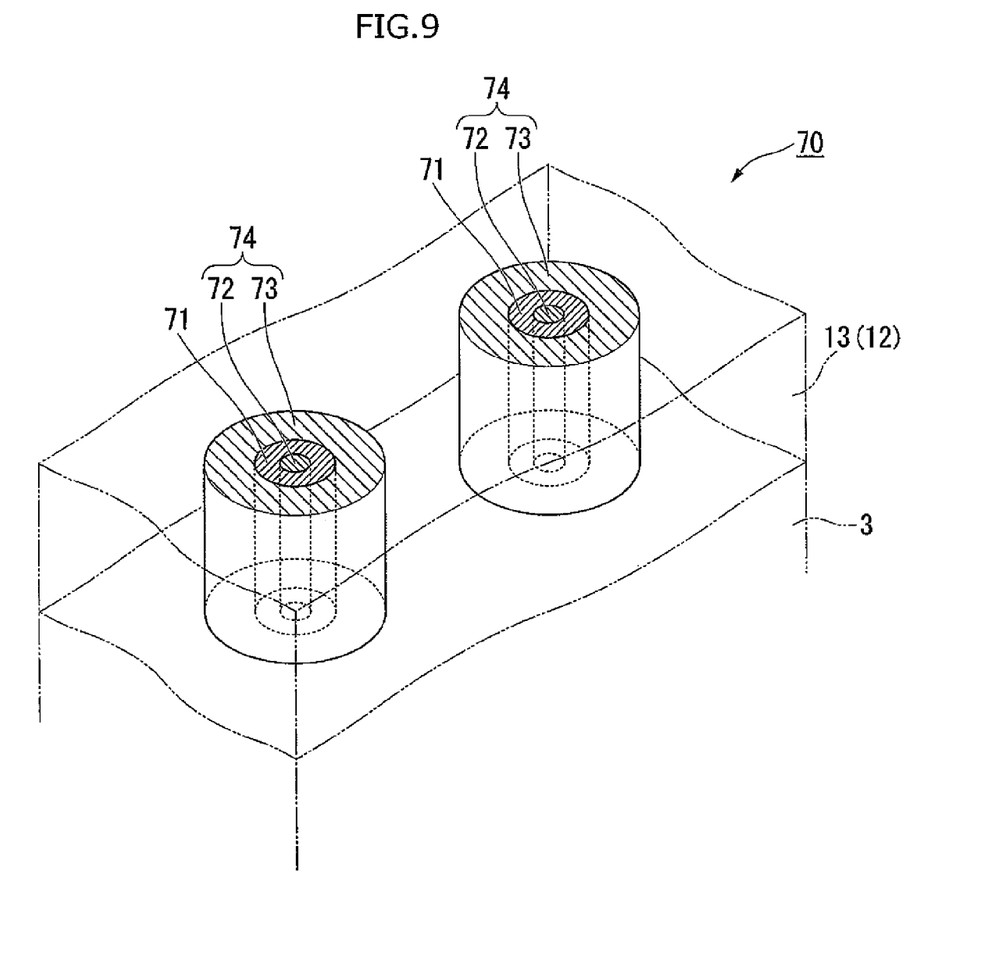
FIG. 9 is a partially perspective view that shows a magnetic recording medium in a fourth embodiment of the invention.

In a magnetic recording medium 70 of the present embodiment, a high thermal conductor 71 forms a cylinder shape. Furthermore, a magnetic body 72 is disposed inside the high thermal conductor 71, and the magnetic body 72 constitutes the same recording bit region 74 together with a magnetic body 73 surrounding the high thermal conductor 71.

According to the magnetic recording medium 70 of the configuration as mentioned above, since the heat transmitted from the high thermal conductor 71 toward both of the outside and the inside heats the magnetic bodies 72 and 73, the heating efficiency of the recording bit region 74 is further improved. Furthermore, since a contact area between the high thermal conductor 71 and the recording bit region 74 is further increased, the heat discharging efficiency of the heated recording bit region 74 can be further improved.

In addition, in the present embodiment, the high thermal conductor 71 forms the cylinder shape but may be a C shape or the like when viewed from the upper surface without being limited to a barrel shape such as the cylinder shape.

Fifth Embodiment

Next, a fifth embodiment of the magnetic recording medium in the present invention will be described based on the drawings. In addition, a basic configuration of the embodiment described herein is the same as that of the first embodiment mentioned above, and other elements are added to the first embodiment mentioned above. Thus, in FIG. 10, the same components as those of FIGS. 1 to 6D are denoted by the same reference numerals and the descriptions thereof will be omitted.

Figure 10:
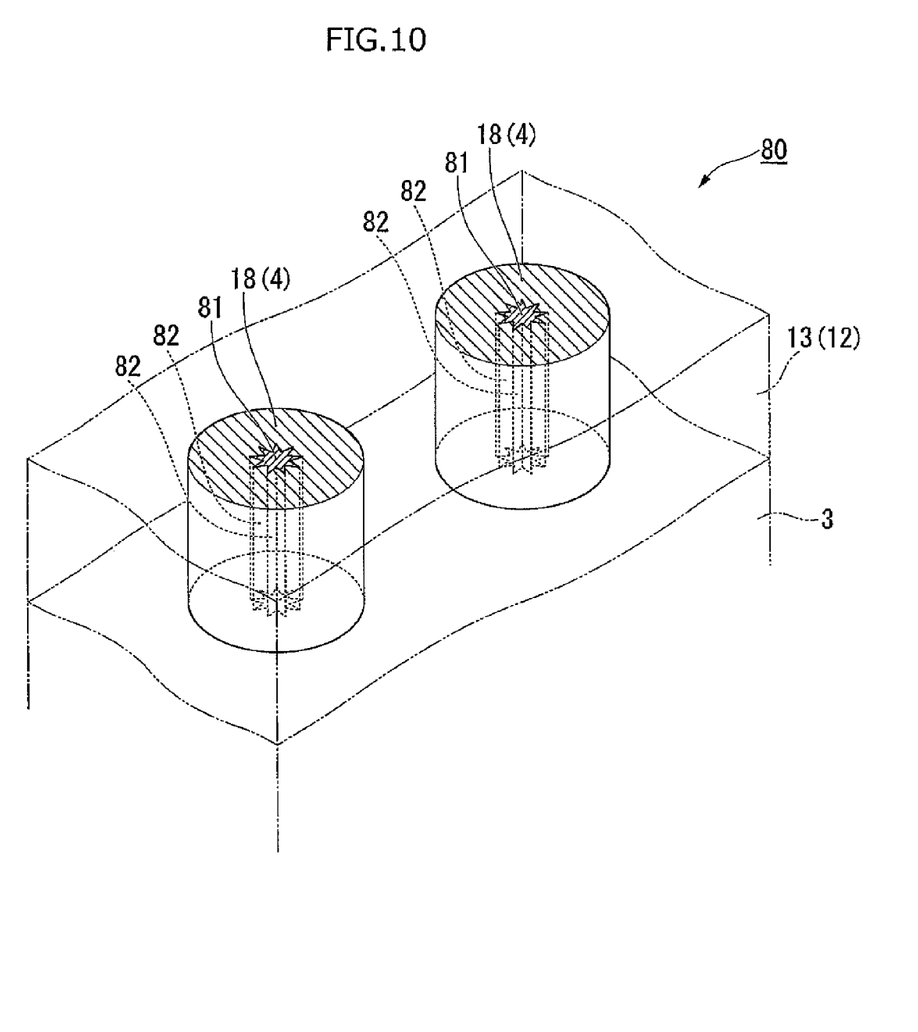
FIG. 10 is partially perspective view that shows a magnetic recording medium in a fifth embodiment of the invention.

In a magnetic recording medium 80 of the present embodiment, a plurality of concave portions 82 depressed inward is formed on an outer peripheral surface of a high thermal conductor 81 along the outer peripheral surface.

According to the magnetic recording medium 80 of the configuration as mentioned above, by forming convexes and concaves on the outer peripheral surface of the high thermal conductor 81 to complicate the cross-sectional shape of the high thermal conductor 81, a contact area between the high thermal conductor 81 and the recording bit region 11 is increased, and the thermal resistance between the recording bit region 11 and the high thermal conductor 81 is lowered. As a result, it is possible to further improve the heat discharging efficiency of the heated recording bit region 11.

Sixth Embodiment

Next, a sixth embodiment of the magnetic recording medium in the present invention will be described based on the drawings. In addition, a basic configuration of the embodiment described herein is the same as that of the first embodiment mentioned above, and other elements are added to the first embodiment mentioned above. Thus, in FIG. 11, the same components as those of FIGS. 1 to 6D are denoted by the same reference numerals and the descriptions thereof will be omitted.

Figure 11:
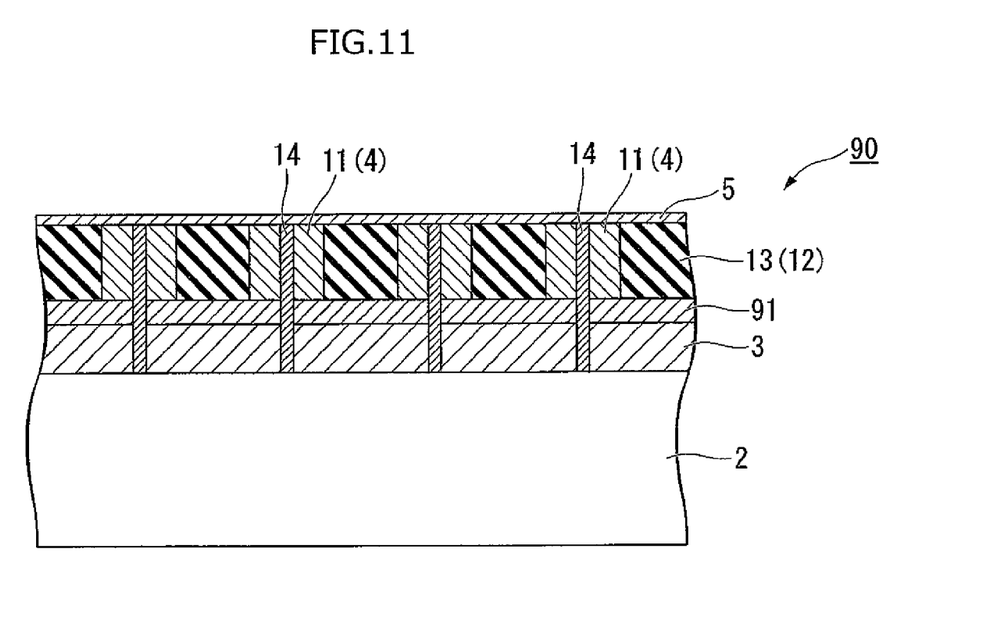
FIG. 11 is partially perspective view that shows a magnetic recording medium in a sixth embodiment of the invention.

In a magnetic recording medium 90 of the present embodiment, the ground layer 3 and an orientation layer 91 are formed between the substrate 2 and the recording layer 4.

The orientation layer 91 is situated further to the recording layer 4 side than the ground layer 3, and is constituted by a layer which orients the easy axis of orientation (an easily magnetized crystal orientation in the magnetic body having crystalline magnetic anisotropy) of the magnetic particles of the recording layer 4 in a certain direction (a horizontal direction or a vertical direction) with respect to the substrate surface of the substrate 2.

Specifically, in the case of orienting the easy axis of magnetization in the horizontal direction, the orientation layer 91 may be formed by the use of a material containing Cr, W, Mo or the like and having a body-centered cubic structure suitable for horizontal magnetic recording. Furthermore, in the case of orienting the easy axis of magnetization in the vertical direction, the orientation layer 91 may be formed by the use of a material containing Ru, Os, Re or the like and having a hexagonal close-packed structure suitable for perpendicular magnetic recording.

Furthermore, in the magnetic recording medium 90 of the present embodiment, the high thermal conductor 14 comes into contact with the substrate 2 through the recording layer 4, the ground layer 3 and the orientation layer 91.

According to the magnetic recording medium 90 of the configuration as mentioned above, since the easy axis of magnetization of the magnetic particles of the recording layer 4 is oriented in the horizontal direction and the vertical direction with respect to the substrate surface of the substrate 2, a stable horizontal or vertical recording medium is provided.

Furthermore, since it is possible to sufficiently ensure a contact area between the high thermal conductor 14 and the ground layer 3 and the orientation layer 91, the heat is easily transmitted from the heated recording layer 4 to the substrate 2 side, the heat discharging efficiency of the heated recording bit region 11 can be improved.

In addition, in the present embodiment, the orientation layer 91 is formed further to the recording layer 4 side than the ground layer 3, but the orientation layer 91 may be formed at the substrate 2 side. However, since the direction of the easy axis of magnetization is more easily and effectively oriented, it is preferable to form the orientation layer 91 at the recording layer 4 side.

In addition, the present invention is not limited to the embodiments mentioned above, but various modifications can be added within the scope not departing from the gist of the present invention.

For example, the recording bit region may be formed of one magnetic particle or more, and a configuration may be adopted in which a concave portion is formed in one magnetic particle and the high thermal conductor is filled in the concave portion.

The high thermal conductor may not penetrate through the recording layer, and may be placed in the substrate to penetrate the recording layer and the ground layer.

The shapes of the recording bit region and the high thermal conductor may be shapes in which forms in each embodiment are suitably combined with each other, and may be another shape.

The high thermal conductor is disposed concentrically with the recording bit region in the middle of the recording bit region, but if the high thermal conductor is surrounded by one recording bit region, the same may not be disposed in the middle of the recording bit region.

The separating portion divides each recording bit region, but may divide each track displaced concentrically. Furthermore, the separating portion may not be formed.

The ground layer is formed between the recording layer and the substrate, but the ground layer may not be formed. Furthermore, the protective film may not be formed. In addition, other layers may be formed in addition to the ground layer and the protective film.

According to the present invention, industrial availability is recognized in regard to a magnetic recording medium which is able to perform writing with high reliability by effectively heating a desired magnetic body and is able to suppress recording loss, erroneous recording or the like by ensuring the thermal stability of other magnetic bodies during recording.

What is claimed is:

1. A magnetic recording medium having a recording layer formed on a substrate, the recording layer comprising a plurality of magnetic recording bit regions, a plurality of high thermal conductors each surrounded by a corresponding one of the magnetic recording bit regions, the high thermal conductors having a thermal conductivity higher than that of the magnetic recording bit regions, and a separating portion that separates the magnetic recording bit regions from one another, the separating portion comprising a low thermal conductor having a thermal conductivity lower than that of the magnetic recording bit regions.

2. The magnetic recording medium according to claim 1, wherein the high thermal conductors penetrate through the recording layer.

3. The magnetic recording medium according to claim 2, wherein a ground layer is formed between the substrate and the recording layer, and the high thermal conductors penetrate through the recording layer and the ground layer.

4. The magnetic recording medium according to claim 1, wherein the high thermal conductors penetrate through the recording layer, and the cross-sectional areas of the high thermal conductors, in a direction perpendicular to the substrate, increase in a direction towards the substrate.

5. The magnetic recording medium according to claim 1, wherein each high thermal conductor has a cylinder shape having an outside and an inside, and the corresponding magnetic recording bit region has a portion disposed inside the high thermal conductor and a portion surrounding the outside of the high thermal conductor.

6. The magnetic recording medium according to claim 1, wherein an outer peripheral surface of each high thermal conductor is formed with a plurality of concave portions depressed inward along the outer peripheral surface.

7. The magnetic recording medium according to claim 1, wherein each magnetic recording bit region and corresponding high thermal conductor are concentric with one another.

8. The magnetic recording medium according to claim 1, wherein the high thermal conductors are formed of a metallic material or a dielectric material.

9. The magnetic recording medium according to claim 3, wherein an orientation layer for orienting a magnetization direction of magnetic particles constituting the magnetic recording bit region in a certain direction with respect to a substrate surface of the substrate is formed between the substrate and the recording layer, and the high thermal conductors penetrate the orientation layer.

10. The magnetic recording medium according to claim 9, wherein the orientation layer is formed further to the recording layer side than the ground layer.

11. The magnetic recording medium according to claim 1, wherein each high thermal conductor extends in the thickness direction of the recording layer into the interior of its corresponding magnetic recording bit region.

* * * * *